(12) United States Patent
Fawcett (10) Patent No.: US 9,909,604 B1
(45) Date of Patent: Mar. 6, 2018

(54) SYSTEM AND METHOD OF SECURING ADJOINING WALLS UTILIZING KEYS

(71) Applicant: John Wesley Fawcett, Burien, WA (US)

(72) Inventor: John Wesley Fawcett, Burien, WA (US)

( * ) Notice: Subject to any disclaimer, the term of this patent is extended or adjusted under 35 U.S.C. 154(b) by 0 days.

(21) Appl. No.: 15/256,476

(22) Filed: Sep. 2, 2016

(51) Int. Cl.
*E04B 1/00* (2006.01)
*F16B 5/00* (2006.01)
*F16B 3/00* (2006.01)
*F16B 12/10* (2006.01)

(52) U.S. Cl.
CPC .............. *F16B 5/0056* (2013.01); *F16B 3/00* (2013.01); *F16B 5/0012* (2013.01); *F16B 12/10* (2013.01)

(58) Field of Classification Search
CPC ........... E16B 3/00; F16B 5/0012; F16B 12/10
USPC ........................................................... 52/284
See application file for complete search history.

(56) References Cited

U.S. PATENT DOCUMENTS

| | | | | | |
|---|---|---|---|---|---|
| 1,012,185 | A * | 12/1911 | Barton | ...................... | B41B 1/28 |
| | | | | | 101/404 |
| 1,023,118 | A * | 4/1912 | Bales | ....................... | E04B 2/04 |
| | | | | | 52/140 |
| 1,271,160 | A * | 7/1918 | Groves | ................ | A63H 33/044 |
| | | | | | 446/106 |
| 2,279,864 | A * | 4/1942 | Eide | ..................... | A47B 47/042 |
| | | | | | 206/557 |
| 2,832,100 | A * | 4/1958 | Swallert | ................. | A63H 33/06 |
| | | | | | 403/387 |
| 2,915,040 | A * | 12/1959 | Ward | ..................... | A01K 31/14 |
| | | | | | 119/431 |
| 2,918,995 | A * | 12/1959 | Kruger | ................... | E04C 2/423 |
| | | | | | 217/31 |
| 3,066,436 | A * | 12/1962 | Schuh | .................... | A63H 33/06 |
| | | | | | 428/542.2 |
| 3,547,491 | A * | 12/1970 | Bovasso | ................ | A47C 4/021 |
| | | | | | 297/440.13 |
| 3,591,212 | A * | 7/1971 | Rhyne | ...................... | B27M 1/02 |
| | | | | | 217/65 |
| 3,962,839 | A * | 6/1976 | Ickes | ......................... | E04B 1/04 |
| | | | | | 52/262 |
| 4,082,356 | A * | 4/1978 | Johnson | ................. | A47C 4/021 |
| | | | | | 273/160 |
| 4,140,065 | A * | 2/1979 | Chacon | .................. | A47C 4/021 |
| | | | | | 108/156 |
| 4,188,067 | A * | 2/1980 | Elmer | .................... | A47C 4/021 |
| | | | | | 297/440.13 |
| 4,201,417 | A * | 5/1980 | Griffith | ................... | A47C 4/02 |
| | | | | | 297/440.13 |
| 4,582,002 | A * | 4/1986 | Wright | ................. | A47B 47/042 |
| | | | | | 108/60 |

(Continued)

*Primary Examiner* — Charles A Fox
*Assistant Examiner* — James J Buckle, Jr.
(74) *Attorney, Agent, or Firm* — The Olmsted Law Group, PLLC; Andrew Olmsted (57) ABSTRACT

A system and method for securing adjoining walls without requiring the use of tools is disclosed. A plurality of walls may mate with each other through the use of grooves within each wall to sit flush with each other. A plurality of locking keys may be used to further secure the walls to each other. If disassembly is required, a user may quickly disassemble the present invention by removing the keys and reversing the steps taken to secure the walls to each other. The entire system may pack flat and be stacked once disassembled.

5 Claims, 10 Drawing Sheets

(56) References Cited

U.S. PATENT DOCUMENTS

| | | | | |
|---|---|---|---|---|
| 4,704,313 A * | 11/1987 | Maier | H02B 15/04 428/33 |
| 5,076,546 A * | 12/1991 | Henry | A47D 13/066 256/24 |
| 5,082,329 A * | 1/1992 | Mars | A47C 4/02 108/180 |
| 5,281,181 A * | 1/1994 | McCollum | A63H 33/044 446/106 |
| 5,335,753 A * | 8/1994 | Campbell | B25H 1/06 182/151 |
| 5,527,103 A * | 6/1996 | Pittman | A01K 63/006 217/12 R |
| 5,848,513 A * | 12/1998 | Leslie | E04B 1/34321 52/264 |
| 5,865,660 A * | 2/1999 | Smith | A63H 33/042 446/106 |
| 5,921,631 A * | 7/1999 | Bush | A47C 3/029 297/440.1 |
| 6,595,378 B2 * | 7/2003 | Wang | A47B 47/0075 211/186 |
| 6,675,979 B2 * | 1/2004 | Taylor | A47B 47/042 108/153.1 |
| 6,688,699 B1 * | 2/2004 | Bowie | A47C 4/021 297/440.13 |
| 6,969,037 B2 * | 11/2005 | Eby | A47B 23/042 248/444 |
| 7,168,766 B2 * | 1/2007 | Pelletier | A47C 3/029 297/440.13 |
| 8,621,739 B1 * | 1/2014 | Elliot | A47B 3/06 29/428 |
| 8,651,296 B2 * | 2/2014 | Beaty | A47F 5/11 211/135 |
| 8,832,917 B1 * | 9/2014 | Elliott | B23P 17/00 29/428 |
| 9,072,980 B2 * | 7/2015 | van Tilburg | A63H 3/52 |
| 9,420,879 B1 * | 8/2016 | Brandenberg | A47B 13/088 |
| 9,556,605 B2 * | 1/2017 | Elliott | A63H 33/008 |
| 2002/0104280 A1 * | 8/2002 | Fleishman | E04B 1/61 52/284 |
| 2003/0205180 A1 * | 11/2003 | Bishop | A47B 3/06 108/158.12 |
| 2010/0093257 A1 * | 4/2010 | Elliott | A47B 3/06 446/478 |

* cited by examiner

SYSTEM AND METHOD OF SECURING ADJOINING WALLS UTILIZING KEYS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable

FIELD OF THE INVENTION

The present invention generally relates to systems and methods of securing a plurality of adjoining walls. More particularly, the present invention relates to systems and methods of securing a plurality of adjoining walls without the use of tools. Most particularly, the present invention relates to a system and method of securing a plurality of adjoining walls utilizing a plurality of locking keys.

BACKGROUND OF THE INVENTION

The applications of the present invention are so far-reaching that it is difficult to specify one particular application for the invention or set of problems in the prior art that the invention solves best. In broadest terms, the present invention allows users to form structures that may be easily assembled and disassembled without the use of tools. The modular design of the present invention allows for customization based on the needs of the user, while also allowing for ease of transport when not in use.

For clarity and ease of understanding, the Applicant has prepared this application utilizing small-scale models for illustration purposes and to demonstrate the principals disclosed within. Throughout this application, the Applicant will point out additional embodiments where large-scale use of the concepts of the present invention is applicable.

The inventor has performed a search of the prior art and believes the present invention is a new and useful invention for which patent protection is warranted.

SUMMARY OF THE INVENTION

Within the preferred embodiment and alternative embodiments disclosed herein, a system and method of joining adjacent walls in a manner allowing for quick assembly and disassembly is provided. The system is comprised of a plurality of walls featuring grooves to mate within adjacent walls. To further stabilize the connection between walls, keys may be inserted into additional grooves or holes within the walls. Concurrently provided is a method of using such a system to form varied structures with a wide range of applications, as previously mentioned.

DETAILED DESCRIPTION OF THE INVENTION

Figure 1:
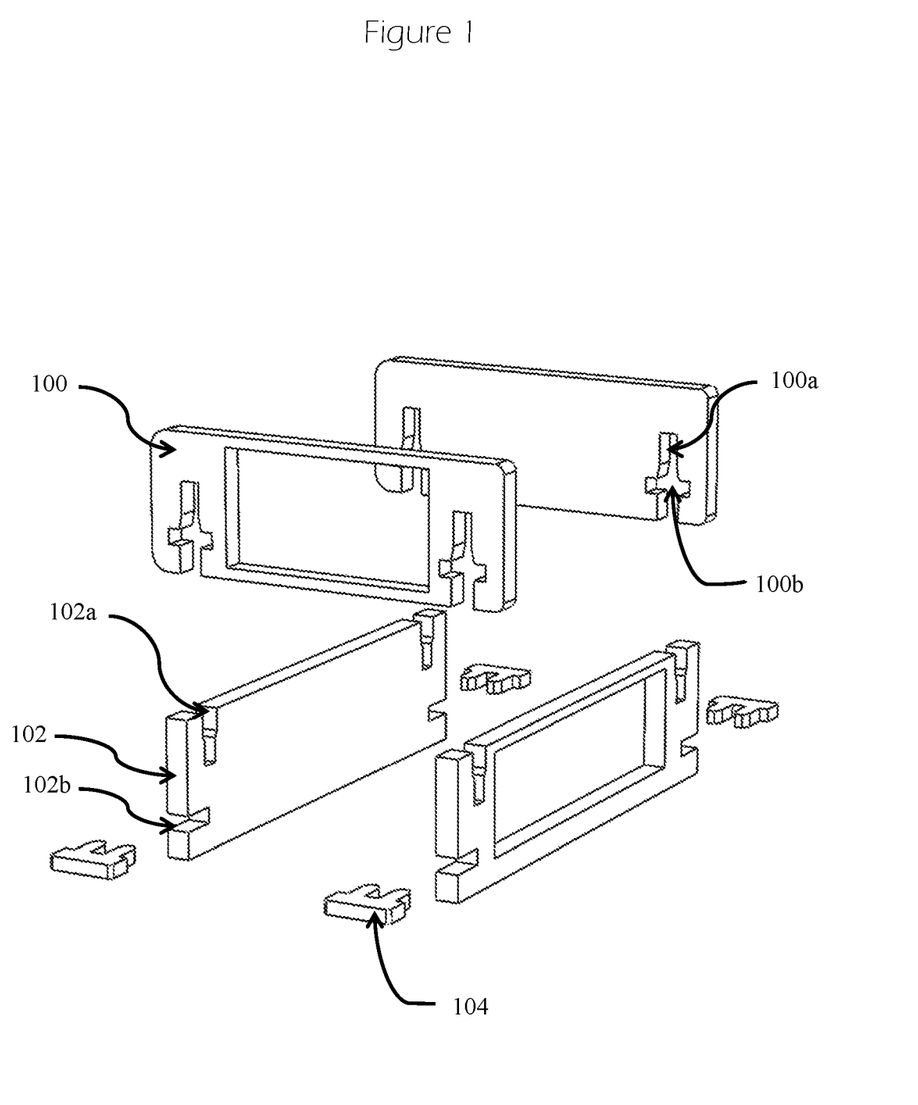
FIG. 1 is a disassembled view of one embodiment of the invention.

Referring now to the first embodiment of the present invention as illustrated in FIG. 1, there is shown the female wall 100, the male wall 102 and the corner key 104. Upon the female wall 100, there is shown a plurality of cutouts, referred to as the vertical grooves 100a and the horizontal grooves 100b. Upon the male wall 102, there is shown a plurality of cutouts, referred to as the vertical grooves 102a and the horizontal grooves 102b.

In order to secure the female wall 100 to the male wall 102, a user would insert the male wall 102 into the female wall 100 at a junction between the vertical cutouts 100a and 102a on each wall. Once mated, the female wall 100 and male wall 102 sit flush with each other. Once each wall 100 102 mates flush with the other 100 102, the corner key 104 may be utilized to further reinforce this connection.

The horizontal groove 100b in the female wall 100 and the horizontal groove 102b in the male wall 100 are positioned such that when both walls 100 102 are mated, their corresponding horizontal grooves 100b 102b allow insertion of a corner key 104 to further secure each wall 100 102 to the other. When the corner key 104 is inserted within the intersection between walls 100 102 and their horizontal channels 100b 102b, a much higher level of rigidity is obtained.

Figure 2:
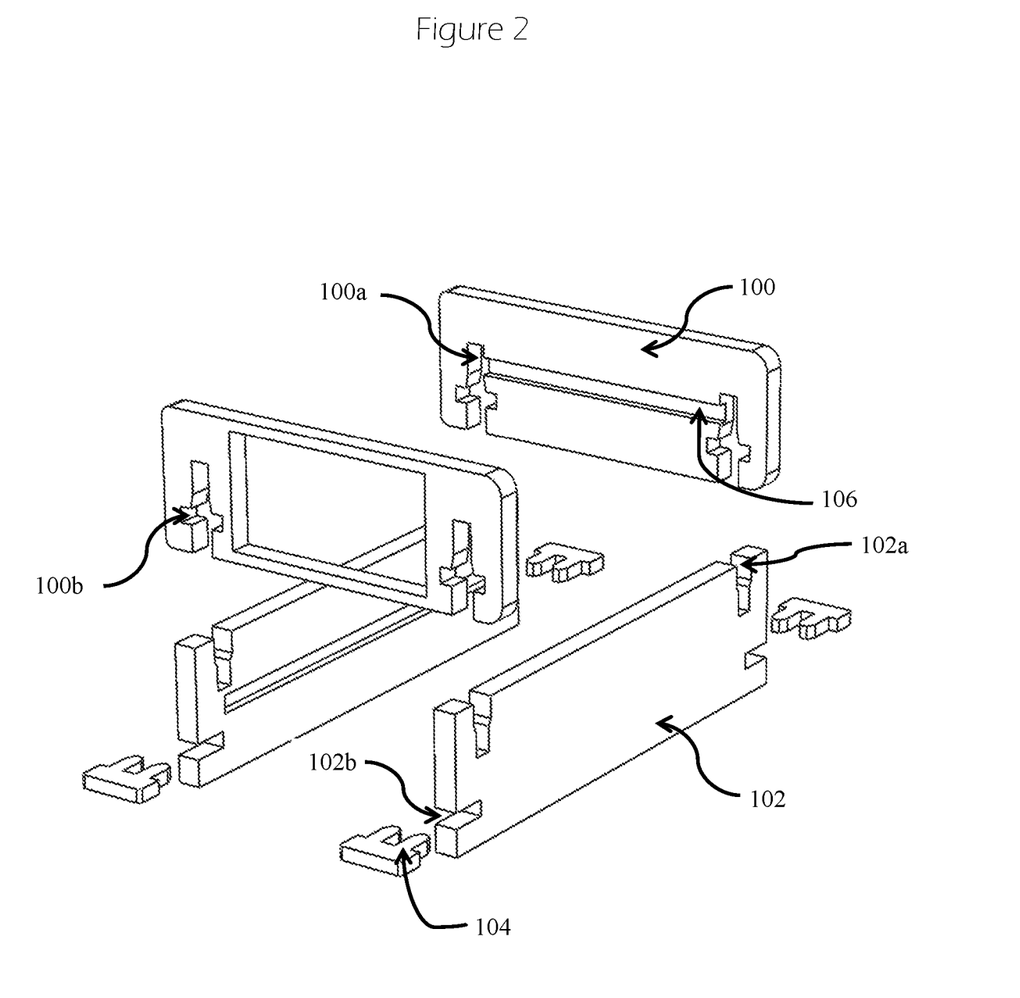
FIG. 2 is a disassembled view of an alternative embodiment of FIG. 1 showing internal channels.

FIG. 2 demonstrates an alternative embodiment of the invention shown in FIG. 1. FIG. 2 shows a series of annular channels 106 within the female wall 100 and male wall 102. Depending on the application of the present invention, it may be advantageous to feature an additional wall within the female walls 100 and male walls 102. For instance, if the present invention were to be utilized horizontally on a small scale as a display or storage tray, an additional wall would allow a surface upon which to rest items. Were the present invention utilized vertically on a small scale, a transparent wall could enclose a photograph and the present invention would function as a picture frame. On a larger scale, the present invention may also function as a display board or a temporary billboard using this same concept.

As previously mentioned, the multitude of applications and scalability of the present invention are very desirable features. One particularly useful application of the embodiment of the present invention as shown in FIG. 2 is in the field of modular dwellings. Natural disasters often mandate the use of portable dwelling units to house those temporarily displaced. Hurricane Katrina in particular demonstrated the difficulty of housing large portions of the populace, as well as the response time for delivery of traditional wheeled dwellings. A large-scale version of the presently discussed embodiment of the invention, utilized in a horizontal manner, may be quickly constructed into a structure with four walls and a floor. A tarp or other suitable cover may then be placed on top of the female walls 100 and male walls 102 to provide additional shelter from the elements. When disassembly is required, the structure may be disassembled and the individual components packed for transport. In this application, multiple sets of the present embodiment could fit within a standard shipping container for rapid deployment when/where necessary.

Figure 3:
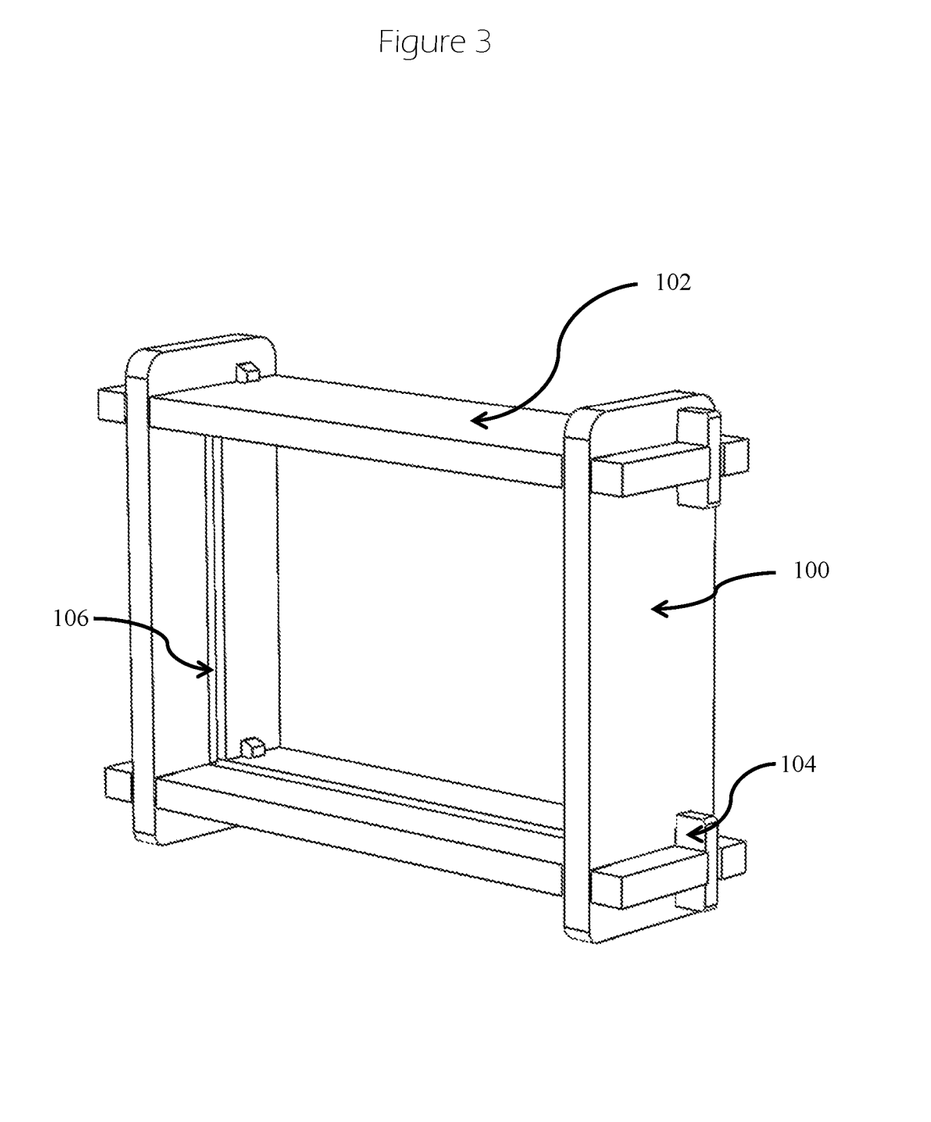
FIG. 3 is an assembled view of the embodiment of FIG. 2, in a vertical orientation.

FIG. 3 shows an assembled view of the present invention, in a vertical orientation. As discussed above, the female walls 100 fit flush with the male walls 102. The corner keys 104 provide addition security and support about the walls 100 102. FIG. 3 also demonstrates the relative placement of channels 106 within the walls 100 102. Depending on the application, channels 106 may not be desired, though they are shown in the Figures for reference purposes.

Figure 4:
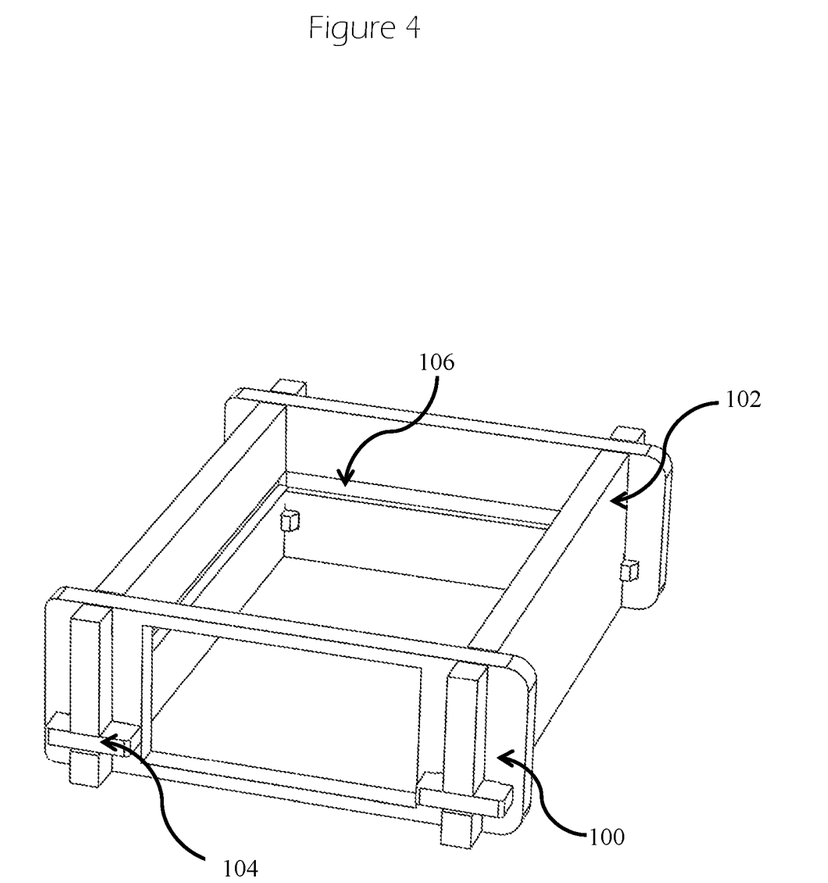
FIG. 4 is an assembled view of the embodiment of FIG. 2, in a horizontal orientation.

FIG. 4 shows an assembled view of the present invention, in a horizontal orientation. The applicant would like to specifically mention that the female wall 100 is illustrated showing a opening within the female wall 100 in the foreground and with channels 106 internal to all walls 100 102. Depending on the application, an opening and/or channels 106 may not be necessary or desired. For instance, if used as a display tray, the opening would not be necessary, but the channels 106 would, for insertion of an additional wall. Same goes if used as a picture frame or a display case. However, if used on a larger scale as a temporary dwelling unit, a cutout would function as a door and be desirable for access.

Figure 5:
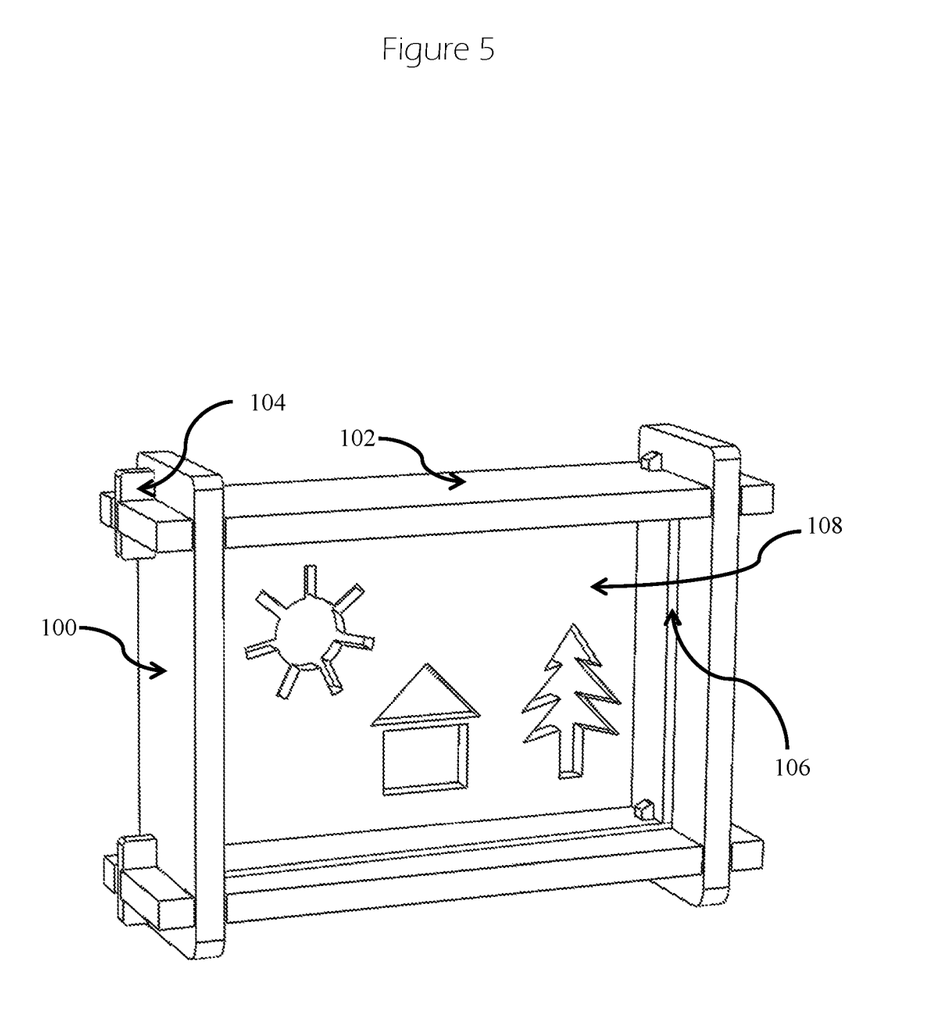
FIG. 5 is an assembled view of the embodiment of FIG. 2, demonstrating one application of the invention.

FIG. 5 shows an assembled view of the present invention, in a vertical orientation. FIG. 5 best demonstrates one small-scale application of the present invention as a display device. The channels 106 within the walls 100 102 allow for assembly of two or three walls 100 102 and insertion of a center wall 108 within the channels 106. Assembly of the remaining wall(s) 100 102 would enclose the center wall 108 within the channels 106 on all four sides. The corner keys 104 would then secure and reinforce the entire structure.

For illustration purposes only, FIG. 5 demonstrates the center wall 108 ornamentally-decorated. The exact nature and appearance of the center wall 108 would be dictated by the particular application of this embodiment of the present invention. For instance, if used as a picture frame, the center wall 108 may consist of two transparent planes within which a picture may be placed. If used as a display, a logo, design or wording may be featured on the center wall 108. Or, the center wall 108 may be featureless and used only as a backdrop, resting surface, or floor.

FIGS. 6-10 show an alternative embodiment of the invention shown in FIGS. 1-5, utilizing many of the same key structural parts.

Figure 6:
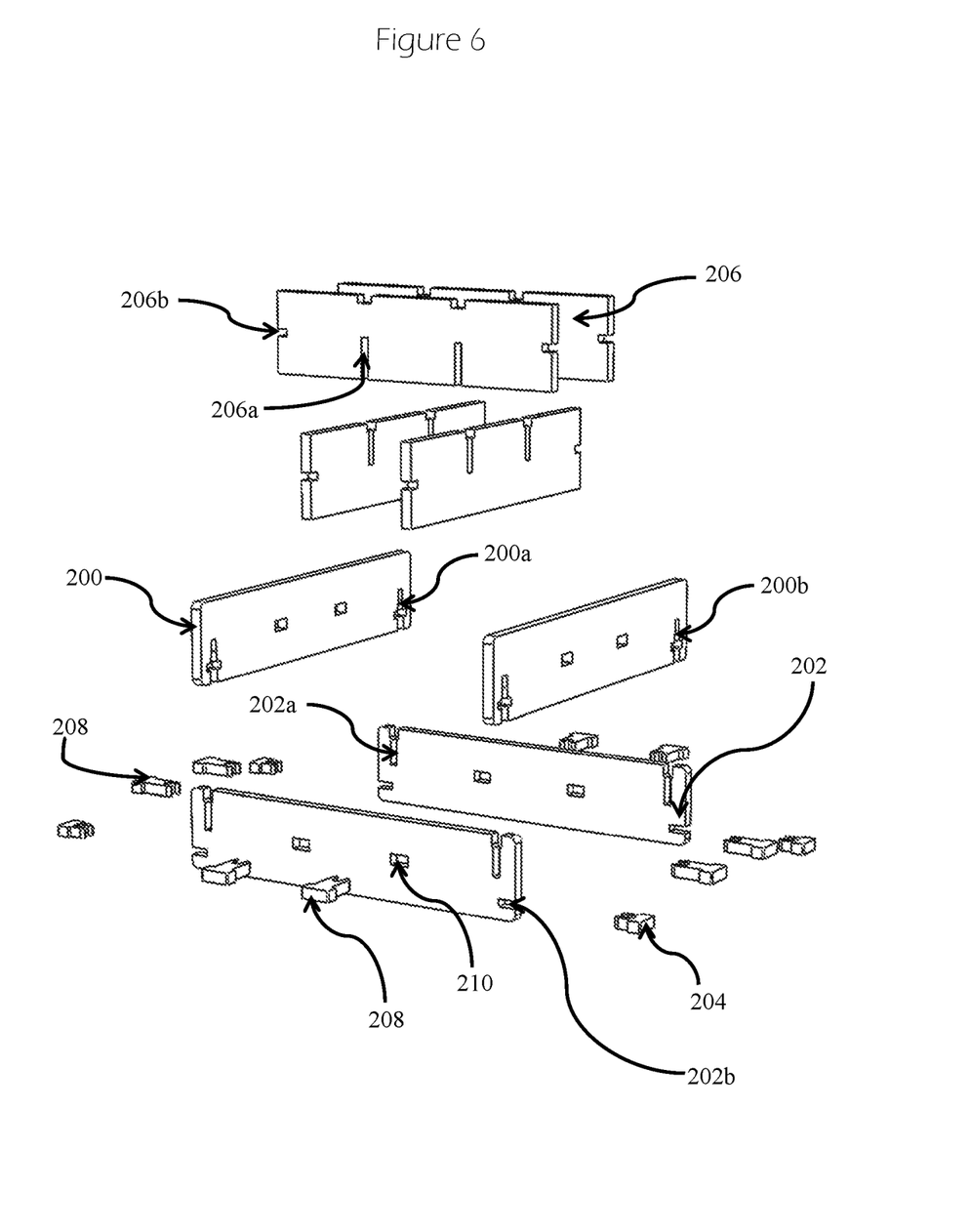
FIG. 6 is a fully disassembled view of another alternative embodiment of the invention.
Figure 7:
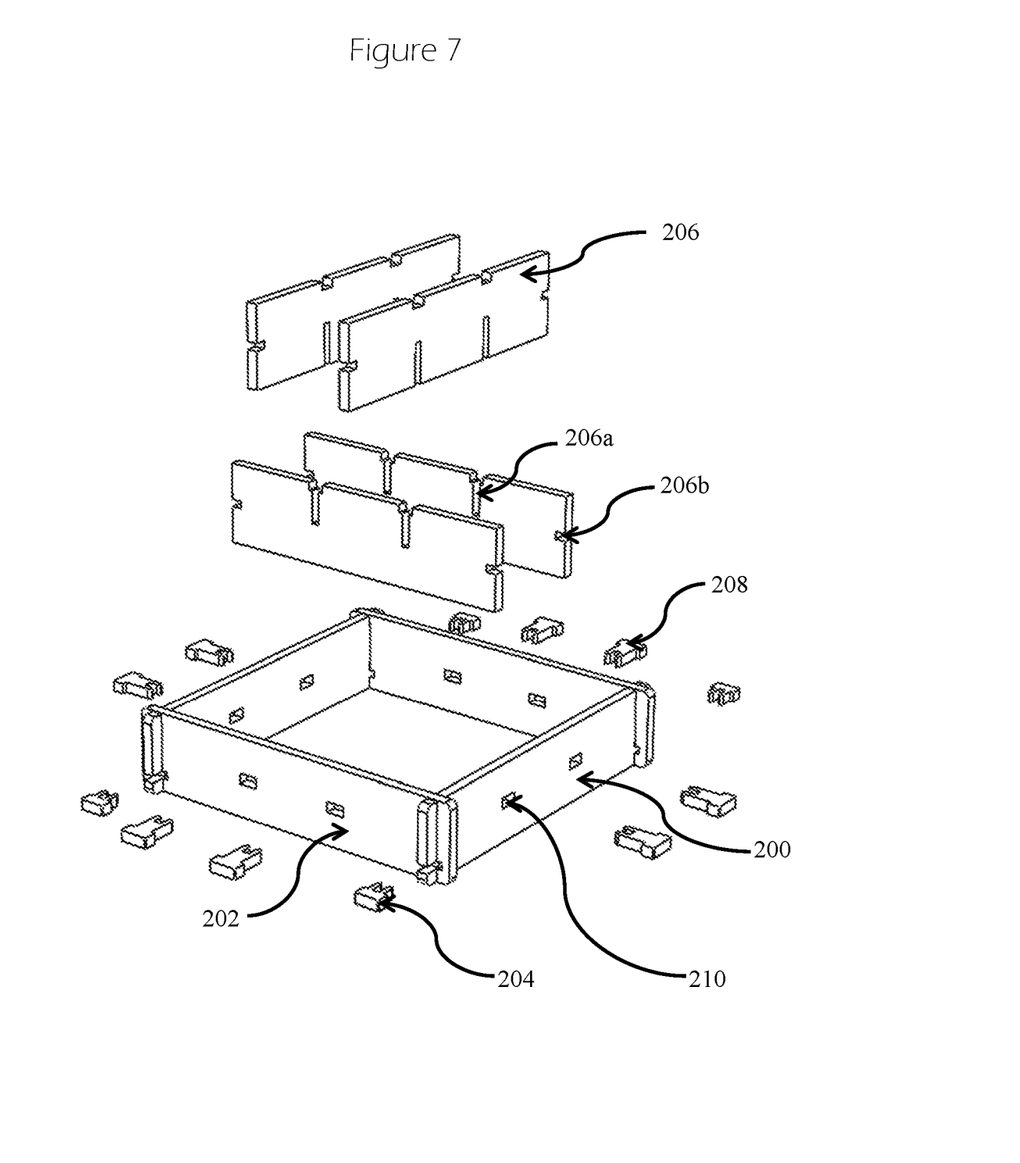
FIG. 7 is a partially assembled view of the embodiment of the invention of FIG. 6.
Figure 8:
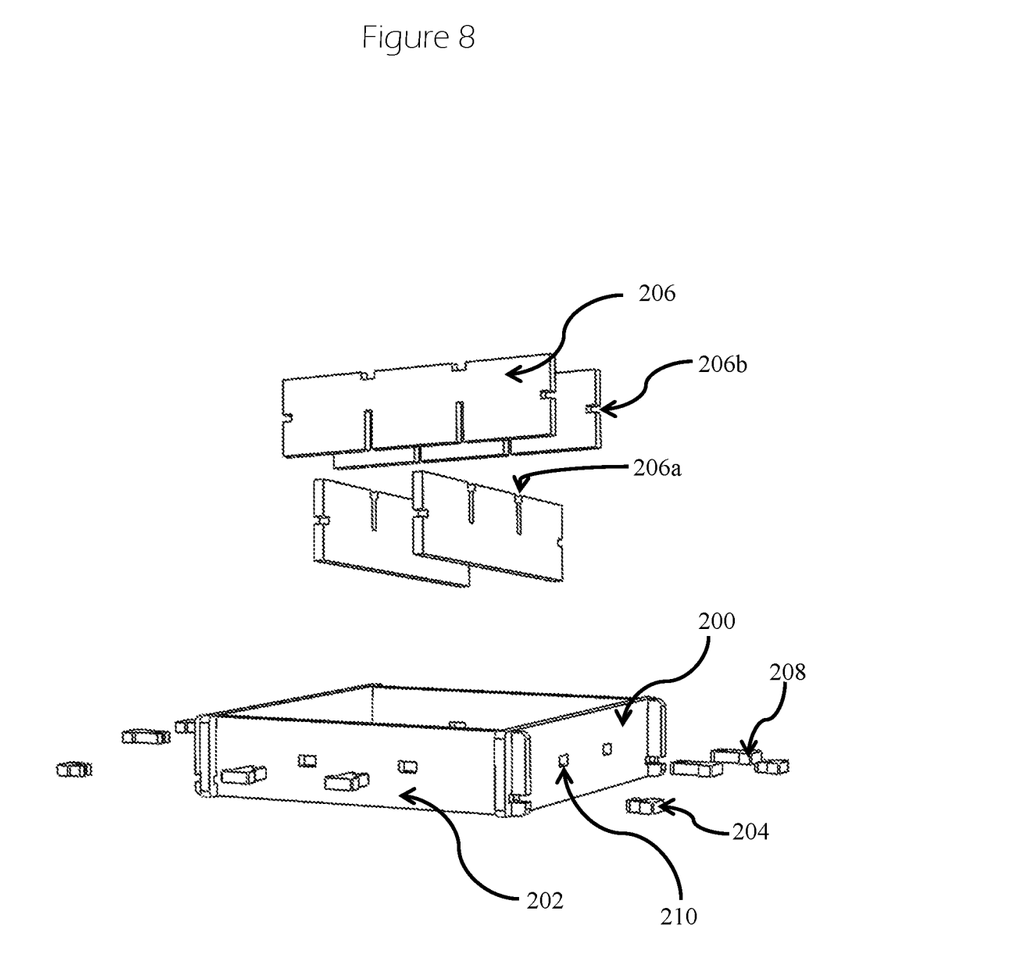
FIG. 8 is a horizontally-rotated view of the embodiment of the invention of FIG. 7.

Referring specifically to FIG. 6, there is shown the female walls 200, the male walls 202 and the corner keys 204. Featured upon the female walls 200, there is shown a series of cutouts, referred to as vertical grooves 200a and horizontal grooves 200b. Featured upon the male walls 202, there is shown a series of cutouts, referred to as vertical grooves 202a and horizontal grooves 202b. Also featured along both the female walls 200 and male walls 202 are a series of side keyholes 210.

FIG. 6 expands upon the embodiments of the present invention discussed in FIGS. 1-5 to include internal walls 206 within the female wall 200 and male wall 202 and a side key 208 to secure the internal walls 206 within the framework provided by the female wall 200 and male wall 202.

Joining the female walls 200 and male walls 202 in the embodiment of the invention shown in FIGS. 6-10 is the same as in the embodiment shown in FIGS. 1-5. The walls 200 202 mate in the same manner, and corner keys 204 may be inserted to further secure the connection between the walls 200 202.

Referring in more detail to the internal walls 206 as shown in FIG. 6, there is shown a series of vertical grooves 206a and horizontal grooves 206b within the internal walls 206. To form a series of compartmentalized shelves within the outer walls 200 202, the user would perpendicularly slide one internal wall 206 into a mating internal wall 206 at the locus of each wall's 206 vertical grooves 206a. The depth of each vertical groove 206a is such that travel past the point of flush between the mating internal walls 206 is not possible.

This embodiment calls for at least one set of internal walls 206, which would allow a 2×2 matrix within the outer walls 200 202. A single vertical groove 206a on each internal wall 206, positioned appropriately, would accomplish this. The addition of a second vertical groove 206a on each internal wall 206, would allow a 3×3 matrix, as shown best by FIG. 10. Addition of a third vertical groove 206a would allow a 4×4 matrix, and so forth.

Figure 9:
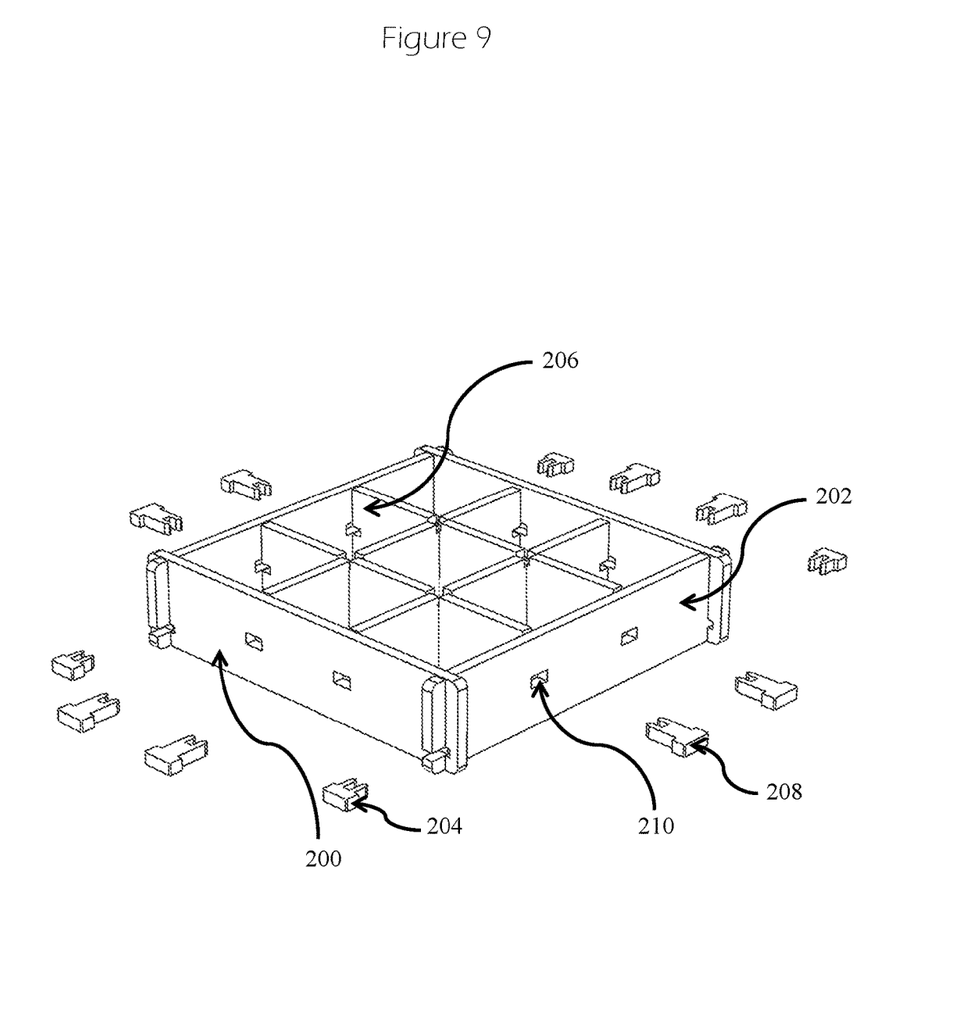
FIG. 9 is a partially assembled view of the embodiment of the invention of FIG. 7, with internal shelving.

FIG. 9 demonstrates a 3×3 matrix configuration of this particular embodiment. Shown in FIG. 9 is the relative placement of the internal walls 206 within the frame of the female wall 200 and male wall 202. Also shown are the corner keys 204, side keys 208 and side keyholes 210, prior to insertion of the keys 204 208 into the appropriate channels.

Whatever the particular configuration, the matrix formed by joining the internal walls 206 sits flush within the frame created when the female walls 200 and male walls 202 are joined and secured by the corner key(s) 204. Once the internal walls 206 are positioned within the outer female and male walls 200 202, the side keys 208 are able to pass through the side keyholes 210 and mate within the horizontal grooves 206b featured along the internal walls 206. The nature of this interaction is such that when all pieces are slid into place, a rigid structure with internal shelving is created.

Figure 10:
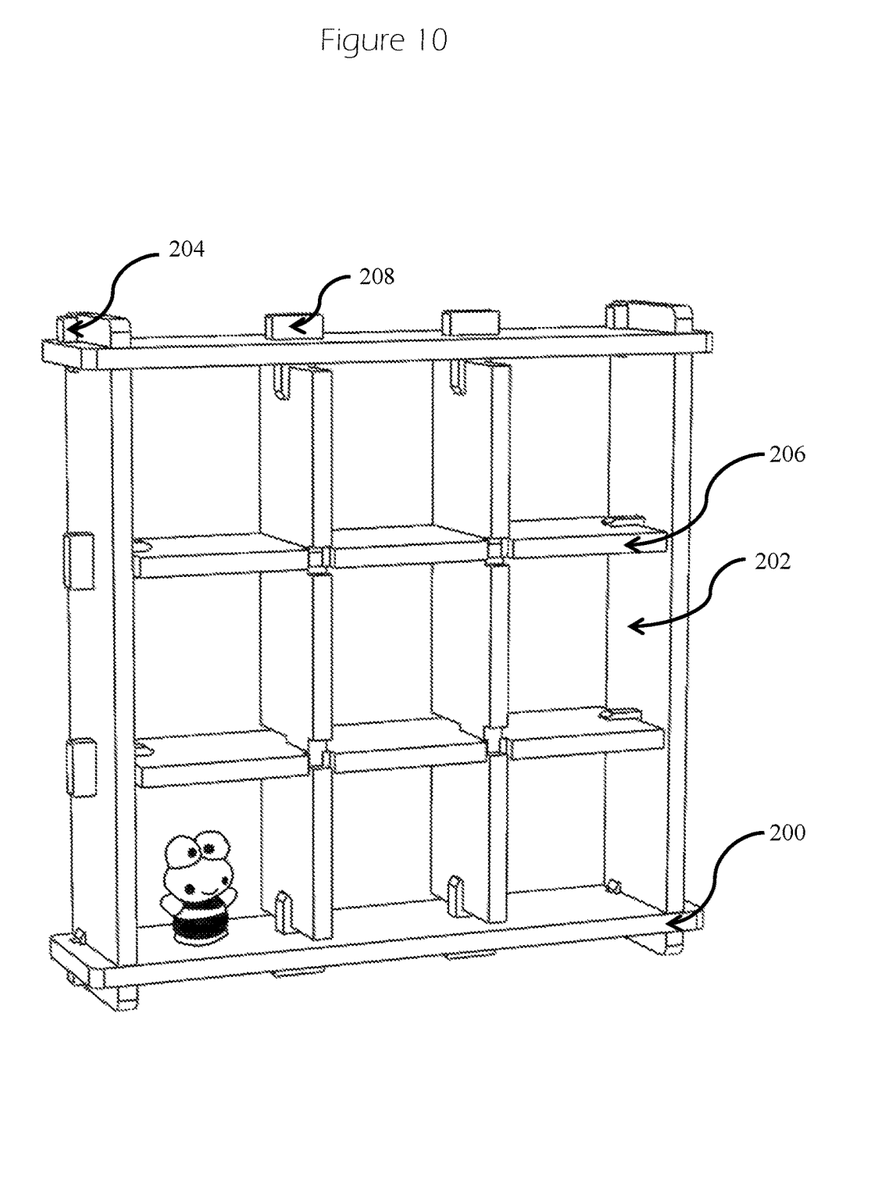
FIG. 10 is a fully assembled view of the embodiment of the invention of FIG. 6, positioned in an upright orientation demonstrating one application.

FIG. 10 is a fully assembled view of this embodiment of the present invention, shown in vertical orientation. In FIG. 10, the female 200 and male 202 walls are interconnected and secured with the corner keys 204. The matrix formed by interconnection of the internal walls 206 is shown, as is the use of the side keys 208 to secure the internal walls 206 within the female 200 and male 202 walls. As mentioned above, the user may utilize differing configurations and placement of the internal walls 206 upon each other to create compartments of varying numbers, sizing and placement, as desired.

FIG. 10 merely shows one particular application of this embodiment as a shelving structure. A frog figurine is shown for illustration purposes. Scalability remains a desirable feature of this invention. The reader and those skilled in the art will realize its application across a wide range of fields. For instance, larger units may be used as point of sale displays, or as display cases at trade shows, or as shelving in a home or office.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the described embodiments, methods, and examples, but by all embodiments and methods within the scope and spirit of the invention as claimed.

What is claimed is:

1. A system of securing adjoining walls comprising:
   at least one female wall with an interior portion, an exterior portion, a top portion, a bottom portion, a fore portion and an aft portion, said wall including horizontal grooves and vertical grooves featured at the top and bottom aft portions;
   at least one male wall with an interior portion, an exterior portion, a top portion, a bottom portion, a fore portion and an aft portion, said wall including horizontal grooves at the top and bottom aft portion and vertical grooves at the top and bottom fore portions;
   at least one key for insertion through the intersection of the horizontal grooves at the aft portions of each wall once the walls are mated at the loci of the vertical grooves of each wall to secure the male walls to the female walls.

2. The system of claim 1, with a continuous annular channel within the interior portion of each wall and an additional wall held in place within said annular channel.

3. The system of claim 1, where at least one wall features an opening for access to the interior portion of the system from the exterior portion of the system.

4. The system of claim 3, where each wall features a means for attaching a cover.

5. A system of securing adjoining walls comprising:
   at least one female wall with an interior portion, an exterior portion, a top portion, a bottom portion, a fore portion and an aft portion, said wall including horizontal grooves and vertical grooves featured at the upper and lower aft portions;
   at least one male wall with an interior portion, an exterior portion, a top portion, a bottom portion, a fore portion and an aft portion, said wall including horizontal grooves at the upper and lower aft portion and vertical grooves at the upper and lower fore portions;
   a plurality of openings on the male walls and female walls equidistant between the fore and aft portions of each wall and between the top portions and bottom portions of each wall;
   at least one wall with an interior portion, an exterior portion, a top portion, a bottom portion, a fore portion and an aft portion, said wall including vertical grooves along the aft portion and horizontal grooves equidistant between the fore portion and aft portion at the top portion and the bottom portion, said wall(s) of a width which allows insertion internal to, and flush with, the male and female walls;
   at least one key for insertion through the intersection of the horizontal grooves at the aft portions of the male and female walls once the walls are mated at the loci of the vertical grooves of each wall to secure the male walls to the female walls;
   at least one key to pass through openings along the external portions of the male and female walls and into the horizontal grooves on the wall(s) internal to the male walls and female walls and to secure the wall(s) internal to the male walls and female walls to the male walls and female walls.

* * * * *